(12) United States Patent
Kuth

(10) Patent No.: US 7,472,111 B2
(45) Date of Patent: Dec. 30, 2008

(54) METHOD AND COMPUTER FOR THE PROVISION OF ADDITIONAL INFORMATION

(75) Inventor: Rainer Kuth, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 29 days.

(21) Appl. No.: 10/492,800

(22) PCT Filed: Oct. 9, 2002

(86) PCT No.: PCT/DE02/03815

§ 371 (c)(1),
(2), (4) Date: Apr. 15, 2004

(87) PCT Pub. No.: WO03/036513

PCT Pub. Date: May 1, 2003

(65) Prior Publication Data

US 2004/0249850 A1   Dec. 9, 2004

(30) Foreign Application Priority Data

Oct. 18, 2001   (DE) .................................. 101 51 437

(51) Int. Cl.
G06F 17/30   (2006.01)

(52) U.S. Cl. ............................ 707/3; 707/100; 707/102

(58) Field of Classification Search .............. 715/501.1, 715/526; 707/3–6, 102, 100
See application file for complete search history.

(56) References Cited

U.S. PATENT DOCUMENTS

| 5,579,407 | A | * | 11/1996 | Murez ........................ 382/164 |
| 6,003,040 | A |   | 12/1999 | Mital et al. |
| 6,122,647 | A | * | 9/2000 | Horowitz et al. ................ 715/3 |
| 6,651,058 | B1 | * | 11/2003 | Sundaresan et al. ............ 707/3 |
| 6,839,704 | B2 | * | 1/2005 | Hughes et al. .................. 707/3 |
| 2004/0064468 | A1 | * | 4/2004 | David et al. .................. 707/100 |

FOREIGN PATENT DOCUMENTS

EP   0 926 606 A2   7/1998

* cited by examiner

*Primary Examiner*—Charles Rones
*Assistant Examiner*—Rezwanul Mahmood
(74) *Attorney, Agent, or Firm*—Schiff Hardin LLP

(57) ABSTRACT

The invention relates to a method for the provision of information additional to reproduced information and use of a program loaded in an arithmetic unit (1) for reproduction of information, whereby the program contacts at least one data bank (6 to 10), which may contain logical additional information to the information reproduced by the program. Should there be additional information for reproduced information in the data bank (6 to 10), the program marks the information and links the information Lu the additional information, whereby the marking of the information may be activated such that the additional information can be displayed. The invention further relates to a computer (1) provided with such a program.

22 Claims, 3 Drawing Sheets

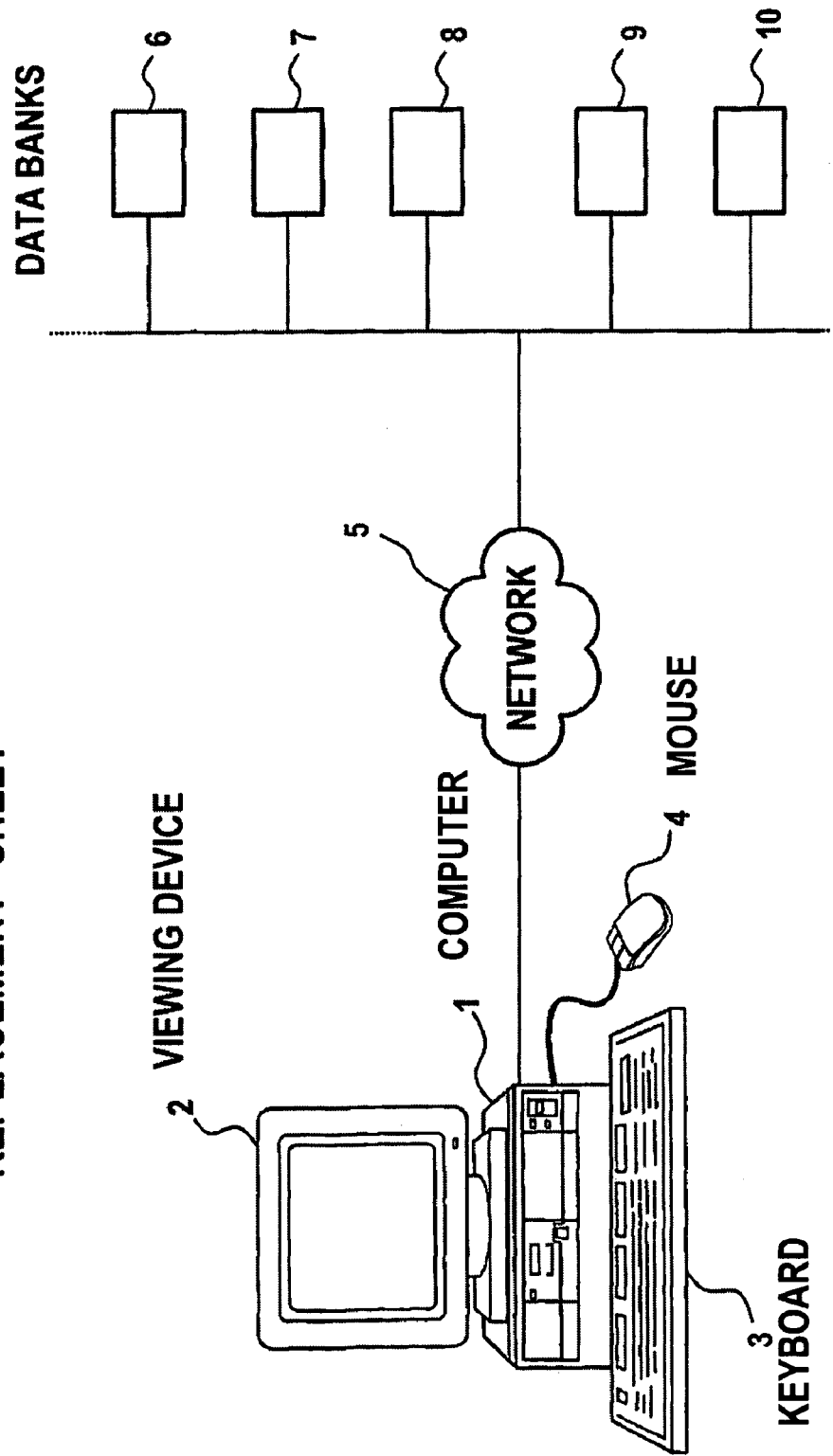

| | |
|---|---|
| AN: | PAT 1999-288978 |
| TI: | Medical system with X-ray device and therapy device and source of focused acoustic waves has X-ray system adjustable relative to therapy device source |
| PN: | DE19746956-A1 |
| PD: | 12.05.1999 |
| AB: | The medical system has an X-ray device (1) with an X-ray system adjustable relative to an object (P) and provided with an X-ray source (10) and an X-ray detector (11). It also has a therapy device (2) with a source (14) for generating acoustic waves which run together into a focus (F). The therapy device is releasably coupled to the X-ray device such that the focus (F) of the source, after coupling the therapy device to the X-ray device, lies at least approximately in the beam path of the central beam of an X-ray beam bundle running from the source to the detector. The X-ray system is adjustable relative to the source. Preferably the therapy device (2) has a carrier arm (15) which carries the source which is coupled to the X-ray device. The carrier arm can preferably be removed from the therapy device.; USE - Esp. lithotripsy device. ADVANTAGE - Allows therapy device to be easily and reliably coupled to X-ray device. Increases possibilities for X-ray localisation and control. |
| PA: | (SIEI) SIEMENS AG; |
| IN: | HERRMANN K; WINKELMANN G; HERMANN K; |
| FA: | DE 19746956-A1 12.05.1999; US6119034-A 12.09.2000; SG65788-A1 22.06.1999; JP11216134-A 10.08.1999; DE19746956-C2 11.05.2000; |
| CO: | DE; JP; SG; US; |
| IC: | A61B-005/00; A61B-006/00; A61B-006/02; A61B-006/08; A61B-017/22; A61B-017/225; A61B-017/36; G01B-015/00; |
| MC: | S05-A03C; |
| DC: | P31; S05; |
| PR: | DE1046956 23.10.1997; |
| FP: | 12.05.1999 |
| UP: | 20.09.2000 |

FIG 2

| | | |
|---|---|---|
| AN: | PAT 1999-288978 | F1 |
| TI: | Medical system with X-ray device and therapy device and source of focused acoustic waves has X-ray system adjustable relative to therapy device source | F2 |
| PN: | DE19746956-A1 | F3 |
| PD: | 12.05.1999 | F4 |
| AB: | The medical system has an X-ray device (1) with an X-ray system adjustable relative to an object (P) and provided with an X-ray source (10) and an X-ray detector (11). It also has a therapy device (2) with a source (14) for generating acoustic waves which run together into a focus (F). The therapy device is releasably coupled to the X-ray device such that the focus (F) of the source, after coupling the therapy device to the X-ray device, lies at least approximately in the beam path of the central beam of an X-ray beam bundle running from the source to the detector. The X-ray system is adjustable relative to the source. Preferably the therapy device (2) has a carrier arm (15) which carries the source which is coupled to the X-ray device. The carrier arm can preferably be removed from the therapy device.; USE - Esp. lithotripsy device. ADVANTAGE - Allows therapy device to be easily and reliably coupled to X-ray device. Increases possibilities for X-ray localisation and control. | F5 |
| PA: | (SIEI) SIEMENS AG; | F6 |
| IN: | HERRMANN K; WINKELMANN G; HERMANN K; | F7 |
| FA: | DE 19746956-A1 12.05.1999; US6119034-A 12.09.2000; SG65788-A1 22.06.1999; JP11216134-A 10.08.1999; DE19746956-C2 11.05.2000; | F8 |
| CO: | DE; JP; SG; US; | F9 |
| IC: | A61B-005/00; A61B-006/00; A61B-006/02; A61B-006/08; A61B-017/22; A61B-017/225; A61B-017/36; G01B-015/00; | F10 |
| MC: | S05-A03C; | F11 |
| DC: | P31; S05; | F12 |
| PR: | DE1046956 23.10.1997; | F13 |
| FP: | 12.05.1999 | F14 |
| UP: | 20.09.2000 | F15 |

FIG 3

METHOD AND COMPUTER FOR THE PROVISION OF ADDITIONAL INFORMATION

BACKGROUND OF THE INVENTION

The invention concerns a method to provide additional information using a program, loaded on a computer, to reproduce information. The invention moreover concerns a computer comprising such a program to reproduce information.

Documents, in particular documents which are provided for an expert circle of readers, frequently contain technical terms and subject-specific abbreviations. These technical terms and subject-specific abbreviations frequently cause an inexperienced or non-expert reader of the document difficulties in completely comprehending the content or statement of the document, since additional information connected with the technical terms or the subject-specific abbreviations remains hidden to him.

For documents which exist in file form and can be displayed on a computer using a text processing program (such as Microsoft Word™), it is known, for example, to provide a spelling aid which checks every word of a document for the correct spelling and, if necessary, gives suggestions for improvement. Furthermore, databank-based thesauruses exist which can offer one or more words for each individual word of a document which have the same or a similar meaning as the individual word. Moreover, it is known to provide individual words or sequences of documents existing in file form (for example, in "interactive books") with hyperlinks in order to be able to access data which, for example, are present on the same data medium as the document itself, or in order to refer to data on the Internet.

However, none of these known methods solves the problem indicated previously: to make an arbitrary document comprising technical terms and subject-specific abbreviations and present in file form more intelligible for an non-expert reader via the provision of additional information.

SUMMARY OF THE INVENTION

The invention is therefore based on the object to provide a method and a computer of the previously cited type which enable additional information that can be retrieved in a comfortable manner to be provided in addition to information reproducible on a viewing device.

According to the invention, this object is achieved via a method to provide additional information using a program, loaded on a computer, to reproduce information, comprising: a) contacting, by the program, at least one databank which can comprise at least one item of logical additional information regarding information reproducible with the program; b) comparing at least one element of reproducible information with at least one element comprised in the databank; c) marking the element of the reproduced information when logical additional information regarding the element exists in the databank; and d) linking the marked element of the reproducible information with the additional information, the marking of the element configured to be activated such that the additional information can be displayed.

This object is also achieved via a computer comprising a program to reproduce information, the program comprising: an input configured to accept commands from a user; a display configured to provide information to a user; a databank communication element configured to contact at least one databank which can comprise at least one item of logical additional information regarding reproducible information; a comparison routine configured to compare one element of reproducible information with at least one element comprised in the databank; an update routine configured to: a) mark the element of the reproduced information when logical additional information regarding the element exists in the databank, and b) link the marked element of the reproducible information with the additional information, the marking of the element configured to be activated such that the additional information can be displayed.

Via contacting of at least one databank, information reproducible on a viewing device is inventively examined as to whether logical additional information exists with regard to least one element of the reproducible information. If this is the case, the corresponding element of the reproducible information is provided with a marking that can be activated, and this element is linked with the additional information present in the databank such that the additional information can be displayed via activation of the marking of the element.

In this manner, it is possible to provide an arbitrary document (containing information which can be displayed with a computer on a viewing device) with links to retrievable additional information existing in databanks. After the inventive modification, a document comprising technical term and subject-specific abbreviations can thus also be completely comprehended in terms of content by an non-expert or inexperienced reader using provided additional information. "Logical additional information" means information which represents knowledge which helps the reader in the understanding of the information and enables logical reasoning.

Various embodiments of the invention are discussed below. According to a variant of the invention, an element of reproducible information is a word, a contraction, a number, a logical structure, a variable or a combination of these. According to a variant of the invention, an element can comprise at least one sub-element. An element can thus, for example, be a generic term under which further terms (namely the sub-elements) can be subsumed. A further variant of the invention provides that various sub-elements belonging to an element which are comprised in reproducible information are uniformly marked, such that it is clear that various sub-elements belong to an element.

According to particularly preferred embodiments of the invention, the program offers a selection of contactable databanks, such that a user can specifically select one or more specific databanks in which additional information regarding reproducible information can be requested. The program can preferably simultaneously search in a plurality of databanks. If additional information regarding an element has been found in various databanks, the element is multiply and distinguishably marked in order to be able to differentiably display additional information.

A variant of the invention provides that the program subjects a pixel graphic file which comprises reproducible information to an OCR (optical character recognition), whereby a file comprising elements is obtained. Based on this file, ultimately logical additional information regarding at least one element comprised in the file is sought in at least one databank and, insofar as additional information regarding the element is present, the section of the pixel graphic file belonging to the element of the comprising file is marked given reproduction of the pixel graphic file. This variant of the invention thus also enables corresponding sections which represent pixel groups in pixel graphic files to be marked, and thus to be provided with a link such that, after activation of the marking, additional information regarding the corresponding sections can be displayed.

According to a further variant of the invention, a categorization of the reproducible information can ensue via a marking of an overall document comprising reproducible information. A "document" is defined as, for example, a file or a data set. Such a categorization can, for example, ensue on the basis of additional information associated with an element, this additional information being predetermined by the user or also already preallocated in the program as a categorization criterion.

According to a further variant of the invention, under consideration of the structure under which information is reproduced, at least one databank (in which at least one item of additional information can be present for information reproducible in the structure element) can be associated with a structure element of the structure. If, for example, specific information is thus reproduced in specific fields, individual fields of a databank can thus be associated in which additional information with regard to the specific information is sought. In this manner, additional information in a databank can be referred to not only starting from an element, but also starting from a field.

Particularly preferred embodiments of the invention provide that the program is an Internet browser and that the marking is a link which refers to additional information existing in a databank.

Another variant of the invention provides that, in the course of the linking, the additional information is added to the reproducible information, such that the additional information is displayed upon activation of the marking. In this manner, existing additional information of reproducible information can be durably appended and be a component (in terms of content) of a document comprising the reproducible information.

DESCRIPTION OF THE DRAWINGS

An exemplary embodiment of the invention is shown in attached schematic Figures.

FIG. 1 is a pictorial block diagram of an inventive computer configured to execute the inventive method;

FIG. 2 is a display of exemplary information reproducible on a viewing device; and FIG. 3 is a display of the reproducible information from FIG. 2 after implementation of the inventive method.

DETAILED DESCRIPTION OF THE PREFERRED EMBODIMENTS

An inventive computer 1 is shown in FIG. 1 as a component of a communication structure. A viewing device 2 and input mechanism (in the form of a keyboard 3 and a computer mouse 4) are connected to the computer 1. The computer 1 is connected with various databanks 6 through 10 via a communication network 5, for example, the Internet. Stored on the computer 1 is a program (preferably a modified Internet browser) which can be executed with the computer 1 to reproduce information. The functioning of the program is explained in the following text using reproducible information which originates from the query of a patent databank (not shown).

In FIG. 2, a data set comprising information from the query of the patent databank is shown in a known manner on the viewing device 2 which is connected to the computer 1. The data set comprises a plurality of information regarding a patent application. The reproduced information comprises a plurality of elements (by which can be understood abbreviations, words, numbers, logical structures, variables or combinations of the same) whose meanings are known to an expert reader but do not disclose themselves to an inexperienced or non-expert reader without anything further. Moreover, further information connected with elements, which an expert reader can associate with these elements, remain hidden from the inexperienced or non-expert reader.

With the help of the inventive method, additional information can now be made available to an inexperienced or non-expert reader, such that they can also completely comprehend the reproduced information and can draw logical conclusions. It is inventively provided that, to provide additional information, the program contacts at least one databank which comprises logical additional information regarding individual elements of the information reproduced in FIG. 2. "Logical additional information", is defined as information serving for the comprehension of the reproduced information which represent knowledge and enable the reader to draw logical conclusions.

The program thereby compares elements of the reproduced information with elements comprised in the databank, marks any elements of the reproduced information for which logical additional information exist in the databank, and links the marked elements of the reproduced information with the additional information in the databank, whereby the marking of an element can be activated such that the additional information can be displayed on a viewing device 2 in addition to the reproduced information.

To contact one or more databanks, the program provides the respective user with a user interface (not explicitly shown in the Figures) by way of which the user of the program can select from a predetermined number of contactable databanks one or more databanks in which the program can and should also simultaneously search for additional information for the reproduced information on the viewing device 2. If the user has selected the corresponding databanks, he can initiate the search for additional information via the program.

FIG. 3 shows the result of the execution of the method. As is clear from FIG. 3, elements of the reproduced information are marked and linked with information from the contacted databanks, such that one or more items of additional information can be displayed on the viewing device 2 upon activation of the marking of an element.

In the case of the present exemplary embodiment, the databank 6 (connected with the computer 1 via the communication network 5) which comprises additional information regarding the abbreviations combined under the reference character 20 was selected. In the case of the present embodiment, after processing by the program, the abbreviations are respectively marked with a line 21 running laterally, such that it is immediately clear for the reader of the reproduced information that additional information exists for this.

Given this type of marking, in the course of linking the reproduced information with additional information, the additional information is added to the reproduced information (thus becomes part of the reproduced information) such that the corresponding additional information is displayed on the viewing device 2 via activation of one of the markings 21. An activation of one of the markings 21 can, for example, ensue in that a cursor (not explicitly shown in FIG. 3) can be moved with, e.g., a computer mouse 4 to one of the markings 21, and, by clicking, the additional information can be displayed.

If a user proceeds in this manner, in that he, for example, moves the cursor to the marking 21 added to the abbreviation "PD" and activates the marking 21, the additional information "Priority Date" is displayed on the viewing device 2. In the same manner, the long notations of the other abbreviations combined under the reference character 20 can be displayed as additional information on the viewing device 2.

In the case of the present exemplary embodiment, the information of a data set obtained from the patent databank is reproduced in individual fields F1 through F15, as this is schematically indicated in FIG. 3. Under consideration of this form of the reproduction, the possibility exists to respectively associate a databank in which additional information can be sought with the information of individual fields, and thus individual structure elements.

In the case of the present exemplary embodiment, this is the case for the field F9, in which abbreviations of countries in which patent applications have been submitted are comprised. The databank 7 which comprises long notations regarding the abbreviations of the country names exists associated with the field F9. After processing by the program, markings 22 (given whose activation the long notation can be displayed on the viewing device 2) have been associated with the abbreviations of the country names.

If, for example, an inexperienced reader cannot do anything with the country abbreviation "SG", he can activate, in the previously specified manner, the marking 22 associated with the abbreviation "SG", whereby the long notation (in the present case "Singapore") is displayed on the viewing surface. In the same manner, one or more specific databanks (in which additional information is sought for the information reproduced in the respective field) can be associated with other fields of the reproduced information. The association of databanks with individual fields can ensue via the user or be preallocated in the program dependent on the information to be reproduced.

A second form of the marking is shown as an example of the patent applicant (PA=patent assignee) of the present patent information in the field F6 of the reproduced information. The name Siemens AG is provided with two markings 23 and 24 different from one another which respectively each represent what is known as a hyperlink.

The first hyperlink, characterized as a solid line 23, thereby refers to a first databank 8, and the second hyperlink, characterized with a dash-dot line 24, refers to a second databank 9 in which information regarding Siemens AG can be retrieved. The program can thus also multiply mark elements for which additional information is to be found in different databanks. In contrast to the additional information associated with the markings 21 and 22 (which has been added to the data set and is now part of the data set), the hyperlinks 23, 24 refer only to data or additional information which can be retrieved and displayed via the Internet from the databanks 8 and 9. The additional information located near the hyperlinks 23 and 24 are themselves this not added to the content of the data set.

Individual elements of the reproduced information can also comprise sub-elements. Sub-elements of the element Siemens AG could, for example, be the companies Infineon or OSRAM (not comprised in the present reproduced information) since Siemens AG owns parts of Infineon AG or since OSRAM is a subsidiary of Siemens AG. If the company names Infineon or OSRAM were thus to appear in the reproduced, examined information, these would be provided with a marking as in the same manner as the firm designation Siemens AG, such that for the reader it is immediately recognizable from the reproduced information that a relationship exists between the companies.

A further possibility to provide additional information to an non-expert reader is to mark an entire document comprising reproducible information or (as in the case of the present exemplary embodiment) the entire data set comprising reproducible information regarding the patent application, and thus to categorize the reproduced information. In the case of the present exemplary embodiment, a categorization of the patent application is effected using the publication number (reproduced in field F3) of the data set or of the patent application. The categorization using the publication number of the patent application is thereby based on a query of the databank 10. For example, using the publication number, a categorization can be effected for firm-internal information purposes, such that this patent application is part of a cross-license agreement.

Via activation of the correspondingly set marking 25, ultimately additional information could be displayed which gives information about the cross-license agreement, in particular the contract partner and the contract content. A marking can be characterized by whether the patent application is still held, and thus not yet legally abandoned.

Finally, via activation of the marking 25, additional information can be displayed which gives information about in which countries the patent application is still held and whether protective rights have already been granted.

If the displayable information exist as a pixel (or rasterized) graphic file, for example in PDF format, such that individual elements of the information cannot be extracted and the elements can not be searched in databanks, the respective pixel graphic file can undergo an "OCR" (optical character recognition) with the aid of the program.

Via this procedure, one obtains reproducible information which comprises extractable elements which can be specifically sought in databanks. If additional information regarding individual elements exists in databanks, it enables the program to mark the displayed section of the pixel graphic file regarding the respective element of the obtained file, which, for example, can ensue (in a manner not shown) via a color framing of the respective section. Reproduced information in the form of pixel graphic files can thus accordingly also be provided with markings which, upon activation, lead to a display of additional information identified in databanks.

The markings shown in the exemplary embodiment are, incidentally, to be understood only as exemplary. Other forms of markings of elements can thus also be selected, and more than the shown markings can be set.

Embodiments of the invention were discussed in the preceding text in the example of reproducible patent information. The application of the invention is, however, not limited to this form of reproducible information, but rather can be applied given any form of reproducible information.

The field of medicine, for example, represents a further area of application for the invention. Reproducible information comprising technical terms and subject-specific abbreviations can also here be made intelligible for an inexperienced or non-expert reader via the invention. An example of this is the storage of medical x-ray images in the DICOM format (Digital Imaging and Communication in Medicine).

In this form of x-ray image storage, a data set (with data that, for example, comprises information about the identity of the patient, information about a setting of the x-ray apparatus during the examination, or information about findings) is added to an actual x-ray image. The data set is also designated as a header. Given the reproduction of an x-ray image, these designations are normally reproduced abbreviated. By contacting a suitable databank, these abbreviations in the reproduced information can, as previously specified, be marked and linked with additional information from the databank, such that, given comprehension difficulties, an inexperienced or non-expert reader can display the additional information serving for comprehension via activation of a corresponding marking. For example, in this manner, it is possible to display in long form a finding (for example "IXVB") reproduced in abbreviated form together with the x-ray image.

In the present case, after activation of a marking associated with the abbreviation "IXVB", the following can be displayed: "Suspicion of astrocytoma=fiber-rich growth of the brain made up of cells of the type of the antrocytes (i.e., a branched, star-shaped cell element)".

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

The invention claimed is:

1. A method to provide additional information using a program, loaded on a computer, to reproduce information, comprising:
   a) contacting, by the program, at least one databank which comprises at least one item of logical additional information regarding information reproducible with the program;
   b) comparing at least one element of reproducible information with at least one element in the databank;
   c) marking the element of the reproduced information when logical additional information regarding the element exists in the databank;
   d) linking the marked element of the reproducible information with the additional information such that said marking of the element is activated so that said additional information is displayed;
   e) providing a selection of databanks that are contacted by the program to permit a user to specifically select one or more specific databanks in which additional information regarding reproducible information is requested;
   f) subjecting a pixel graphic file which comprises information to be reproduced to an optical character recognition utility, thereby producing a file;
   g) searching, based on the file generated from this procedure and comprising elements in at least one databank, for logical additional information regarding at least one element in the file; and
   h) marking, if additional information regarding the element is present, a section of the pixel graphic file belonging to the element of the obtained file upon reproduction of the pixel graphic file.

2. The method according to claim 1, wherein at least one of the elements is a word, a contraction, a number, a logical structure, a variable, or a combination of these.

3. The method according to claim 1, wherein at least one of the elements comprises at least one sub-element.

4. The method according to claim 3, further comprising uniformly marking various sub-elements in reproducible information belonging to at least one of the elements.

5. The method according to claim 1, further comprising simultaneously contacting a plurality of databanks with the program.

6. The method according to claim 1, further comprising categorizing reproducible information via a marking of an entire document comprising reproducible information.

7. The method according to claim 1, further comprising associating, under consideration of a structure under which information is reproduced, at least one databank, in which at least one item of additional information is present for information reproducible in the structure element, with a structure element of the structure.

8. The method according to claim 1, wherein the program comprises or is a part of an Internet browser.

9. The method according to claim 1, wherein the marking comprises a link.

10. The method according to claim 1, further comprising, during the linking, adding the additional information to the reproducible information so that the additional information is displayed upon activating the marking.

11. A computer comprising:
   a memory in which one or more computer programs are stored;
   an input accepting commands from a user;
   a display providing information to a user;
   the one or more computer programs comprising:
   a databank communication element contacting at least one databank which comprises at least one item of logical additional information regarding reproducible information;
   a comparison routine comparing one element of reproducible information with at least one element in the databank;
   an update routine: a) marking the element of the reproduced information when logical additional information regarding the element exists in the databank, and b) linking the marked element of the reproducible information with the additional information such that said marking of the element is activated so that said additional information is displayed;

a communication routine contacting a selection of databanks by which a user selects one or more databanks for additional information regarding requested reproducible information;

an optical character recognition routine which accepts a pixel graphic file which comprises information to be reproduced and which produces a file;

a search algorithm searching, based on the file generated from this procedure and comprising elements in at least one databank for logical additional information regarding at least one element in the file; and a marking routine which marks insofar as additional information regarding the element is present, a section of the pixel graphic file belonging to the element of the obtained file upon reproduction of the pixel graphic file.

12. The computer according to claim 11, wherein at least one of the elements is a word, a contraction, a number, a logical structure, a variable or a combination of these.

13. The computer according to claim 11 where at least one of the elements comprises at least one sub-element.

14. The computer according to claim 13, further comprising a marking routine configured to uniformly mark various sub-elements of reproducible information belonging to at least one of the elements.

15. The computer according to claim 11, further comprising a communication routine configured to simultaneously contact a plurality of databanks.

16. The computer according to claim 11, further comprising a routine configured to categorize the reproducible information via a marking of an entire document having reproducible information.

17. The computer according to claim 11, further comprising a routine for associating, under consideration of the structure under which information is reproduced, at least one databank, in which at least one item of additional information is present for information reproducible in the structure element, with a structure element of the structure.

18. The computer according to claim 11, wherein the program comprises or is a part of an Internet browser.

19. The computer according to claim 11, wherein the mark comprises a link.

20. The computer according to claim 11, further comprising a routine configured, in the course of the linking, to add the additional information to the reproducible information so that the additional information is displayed upon activation of the marking.

21. A system configured to provide additional information to a user based on original reproducible information, comprising:

a computer having a memory and comprising a user input accepting commands from a user, a user display presenting information in visual form to the user, and a network connection accessing information located outside of the computer;

one or more data banks comprising the additional information, the data banks having a network connection;

a network to which the network connection of the computer is connected and to which the network connection of the data banks is connected, and over which the additional information is communicated from the data banks to the computer; and a memory of the computer comprising an algorithm running on the computer, the algorithm comprising:

a comparison routine comparing one element of reproducible information with at least one element in the databank;

an update routine: a) marking the element of the reproduced information when logical additional information regarding the element exists in the databank, and b) linking the marked element of the reproducible information with the additional information such that said marking of the element is activated so that said additional information is displayed;

a communication routine contacting a selection of databanks by which a user selects one or more databanks for additional information regarding requested reproducible information;

an optical character recognition routine accepts a pixel graphic file which comprises information to be reproduced and which produces a file;

a search algorithm searching, based on the file generated from this procedure and elements in at least one databank for logical additional information regarding at least one element in the file; and a marking routine marking, insofar as additional information regarding the element is present, a section of the pixel graphic file belonging to the element of the obtained file upon reproduction of the pixel graphic file.

22. A method to provide additional information using a program, loaded on a computer, to reproduce information, comprising:

a) contacting, by the program, at least one databank which comprises at least one item of logical additional information regarding information reproducible with the program;

b) comparing at least one element of reproducible information with at least one element in the databank;

c) marking the element of the reproduced information when logical additional information regarding the element exists in the databank;

d) linking the marked element of the reproducible information with the additional information such that said marking of the element is activated so that said additional information is displayed;

e) providing a selection of databanks that are contacted by the program to permit a user to specifically select one or more specific databanks in which additional information regarding reproducible information is requested;

f) producing a file from a pixel graphic file;

g) searching, based on the file generated and elements in at least one databank, for logical additional information regarding at least one element in the file; and h) marking, if additional information regarding the element is present, a section of the pixel graphic file belonging to the element of the obtained file upon reproduction of the pixel graphic file.

* * * * *